(12) United States Patent
Nanda (10) Patent No.: US 6,792,391 B1
(45) Date of Patent: Sep. 14, 2004

(54) METHOD AND SYSTEM FOR THREE DISK FAULT TOLERANCE IN A DISK ARRAY

(75) Inventor: Sanjeeb Nanda, Winter Springs, FL (US)

(73) Assignee: Adeptec, Inc., Milpitas, CA (US)

( * ) Notice: Subject to any disclaimer, the term of this patent is extended or adjusted under 35 U.S.C. 154(b) by 9 days.

(21) Appl. No.: 10/295,726

(22) Filed: Nov. 15, 2002

(51) Int. Cl.[7] .............................................. G06F 15/00
(52) U.S. Cl. ........................................ 702/185; 714/6
(58) Field of Search ............................ 702/57–59, 117, 702/118, 123, 183–186; 714/5–8, 48, 767–770, 752, 758, 762, 781, 800, 805; 711/114

(56) References Cited

U.S. PATENT DOCUMENTS

| | | | | |
|---|---|---|---|---|
| 5,115,436 A | * | 5/1992 | McAuley | 714/781 |
| 5,303,244 A | * | 4/1994 | Watson | 714/5 |
| 5,499,253 A | * | 3/1996 | Lary | 714/770 |
| 5,537,567 A | * | 7/1996 | Galbraith et al. | 711/114 |
| 5,910,961 A | * | 6/1999 | Tolhuizen et al. | 714/762 |
| 6,158,017 A | * | 12/2000 | Han et al. | 714/6 |
| 6,247,157 B1 | * | 6/2001 | Edirisooriya | 714/767 |
| 6,353,895 B1 | * | 3/2002 | Stephenson | 714/5 |
| 6,636,984 B1 | * | 10/2003 | McBrearty et al. | 714/6 |

* cited by examiner

*Primary Examiner*—Hal Wacheman
*Assistant Examiner*—Mohamed Charioui
(74) *Attorney, Agent, or Firm*—James H. Beusse; Beusse Brownlee Wolter Mora & Maire, P.A.

(57) ABSTRACT

A two-dimensional parity method and system that provides three-disk fault tolerance in an array of disks, such as a RAID system, is presented. The method includes arranging strips containing data in the disk array into horizontal and diagonal parity sets, each parity set including at least one data strip as a member and no single data strip is repeated in any one parity set. The diagonal parity sets are then grouped into two groups of diagonal parity sets—Group 1 and Group 2—such that each data strip is a member of a unique diagonal parity set in Group 1 and a unique diagonal parity set in Group 2. Horizontal XOR parities are calculated and stored in a designated disk. Diagonal XOR parities are calculated and at least some of the diagonal XOR parities are stored in a designated disk. The remaining diagonal parities are stored in a diagonal parity stripe so that diagonal parity can be retrieved in the event of a disk failure.

49 Claims, 6 Drawing Sheets

Disks

| $S_{1,1}$ | $S_{1,2}$ | $S_{1,3}$ | $S_{1,4}$ | ... | ... | $S_{1,N-2}$ | $S_{1,N-1}$ | $S_{1,N}$ | $hP_1$ | $d1P_1$ | $d2P_1$ |
|---|---|---|---|---|---|---|---|---|---|---|---|
| $S_{2,1}$ | $S_{2,2}$ | $S_{2,3}$ | $S_{2,4}$ | ... | ... | $S_{2,N-2}$ | $S_{2,N-1}$ | $S_{2,N}$ | $hP_2$ | $d1P_2$ | $d2P_2$ |
| $S_{3,1}$ | $S_{3,2}$ | $S_{3,3}$ | $S_{3,4}$ | ... | ... | $S_{3,N-2}$ | $S_{3,N-1}$ | $S_{3,N}$ | $hP_3$ | $d1P_3$ | $d2P_3$ |
| $S_{4,1}$ | $S_{4,2}$ | $S_{4,3}$ | $S_{4,4}$ | ... | ... | $S_{4,N-2}$ | $S_{4,N-1}$ | $S_{4,N}$ | $hP_4$ | $d1P_4$ | $d2P_4$ |
| : | : | : | : |   |   | : | : | : | : | : | : |
| : | : | : | : |   |   | : | : | : | : | : | : |
| : | : | : | : |   |   | : | : | : | : | : | : |
| $S_{M-3,1}$ | $S_{M-3,2}$ | $S_{M-3,3}$ | $S_{M-3,4}$ | ... | ... | $S_{M-3,N-2}$ | $S_{M-3,N-1}$ | $S_{M-3,N}$ | $hP_{M-3}$ | $d1P_{M-3}$ | $d2P_{M-3}$ |
| $S_{M-2,1}$ | $S_{M-2,2}$ | $S_{M-2,3}$ | $S_{M-2,4}$ | ... | ... | $S_{M-2,N-2}$ | $S_{M-2,N-1}$ | $S_{M-2,N}$ | $hP_{M-2}$ | $d1P_{M-2}$ | $d2P_{M-2}$ |
| $S_{M-1,1}$ | $S_{M-1,2}$ | $S_{M-1,3}$ | $S_{M-1,4}$ | ... | ... | $S_{M-1,N-2}$ | $S_{M-1,N-1}$ | $S_{M-1,N}$ | $hP_{M-1}$ | $d1P_{M-1}$ | $d2P_{M-1}$ |
| $S_{M,1}$ | $S_{M,2}$ | $S_{M,3}$ | $S_{M,4}$ | ... | ... | $S_{M,N-2}$ | $S_{M,N-1}$ | $S_{M,N}$ | $hP_M$ | $d1P_M$ | $d2P_M$ |
| $d1P_{M+1}$ | $d1P_{M+2}$ | $d1P_{M+3}$ | $d1P_{M+4}$ | ... | ... | $d1P_{M+N-2}$ | $d1P_{M+N-1}$ |   |   |   |   |
|   | $d2P_{M+N}$ | $d2P_{M+N-2}$ | $d2P_{M+N-3}$ |   |   | $d2P_{M+3}$ | $d2P_{M+2}$ | $d2P_{M+1}$ |   |   |   |

Stripes

Fig. 3

| | | | | Disks | | | | | | |
|---|---|---|---|---|---|---|---|---|---|---|
| $S_{1,N}$ | $S_{1,N-1}$ | $S_{1,N-2}$ | $S_{1,N-3}$ | ... | ... | $S_{1,3}$ | $S_{1,2}$ | $S_{1,1}$ | $hP_1$ | $d1P_1$ | $d2P_1$ |
| $S_{2,N}$ | $S_{2,N-1}$ | $S_{2,N-2}$ | $S_{2,N-3}$ | ... | ... | $S_{2,3}$ | $S_{2,2}$ | $S_{2,1}$ | $hP_2$ | $d1P_2$ | $d2P_2$ |
| $S_{3,N}$ | $S_{3,N-1}$ | $S_{3,N-2}$ | $S_{3,N-3}$ | ... | ... | $S_{3,3}$ | $S_{3,2}$ | $S_{3,1}$ | $hP_3$ | $d1P_3$ | $d2P_3$ |
| $S_{4,N}$ | $S_{4,N-1}$ | $S_{4,N-2}$ | $S_{4,N-3}$ | ... | ... | $S_{4,3}$ | $S_{4,2}$ | $S_{4,1}$ | $hP_4$ | $d1P_4$ | $d2P_4$ |
| : | : | : | : | | | : | : | : | : | : | : |
| : | : | : | : | | | : | : | : | : | : | : |
| : | : | : | : | | | : | : | : | : | : | : |
| $S_{M-3,N}$ | $S_{M-3,N-1}$ | $S_{M-3,N-2}$ | $S_{M-3,N-3}$ | ... | ... | $S_{M-3,3}$ | $S_{M-3,2}$ | $S_{M-3,1}$ | $hP_{M-3}$ | $d1P_{M-3}$ | $d2P_{M-3}$ |
| $S_{M-2,N}$ | $S_{M-2,N-1}$ | $S_{M-2,N-2}$ | $S_{M-2,N-3}$ | ... | ... | $S_{M-2,3}$ | $S_{M-2,2}$ | $S_{M-2,1}$ | $hP_{M-2}$ | $d1P_{M-2}$ | $d2P_{M-2}$ |
| $S_{M-1,N}$ | $S_{M-1,N-1}$ | $S_{M-1,N-2}$ | $S_{M-1,N-3}$ | ... | ... | $S_{M-1,3}$ | $S_{M-1,2}$ | $S_{M-1,1}$ | $hP_{M-1}$ | $d1P_{M-1}$ | $d2P_{M-1}$ |
| $S_{M,N}$ | $S_{M,N-1}$ | $S_{M,N-2}$ | $S_{M,N-3}$ | ... | ... | $S_{M,3}$ | $S_{M,2}$ | $S_{M,1}$ | $hP_M$ | $d1P_M$ | $d2P_M$ |
| | $d1P_{M+N-1}$ | $d1P_{M+N-2}$ | $d1P_{M+N-3}$ | ... | ... | $d1P_{M+3}$ | $d1P_{M+2}$ | $d1P_{M+1}$ | | | |
| $d2P_{M+1}$ | $d2P_{M+2}$ | $d2P_{M+3}$ | $d2P_{M+4}$ | | | $d2P_{M+N-2}$ | $d2P_{M+N-1}$ | | | | |

Stripes (row label)

Fig. 4

Disks

| | $d2P_{M+N-1}$ | $d2P_{M+N-2}$ | $d2P_{M+N-3}$ | | | $d2P_{M+3}$ | $d2P_{M+2}$ | $d2P_{M+1}$ | | | |
|---|---|---|---|---|---|---|---|---|---|---|---|
| | $d1P_{M+1}$ | $d1P_{M+2}$ | $d1P_{M+3}$ | $d1P_{M+4}$ | ... | ... | $d1P_{M+N-2}$ | $d1P_{M+N-1}$ | | | |
| | $S_{M,1}$ | $S_{M,2}$ | $S_{M,3}$ | $S_{M,4}$ | ... | ... | $S_{M,N-2}$ | $S_{M,N-1}$ | $S_{M,N}$ | $hP_M$ | $d1P_M$ | $d2P_M$ |
| | $S_{M-1,1}$ | $S_{M-1,2}$ | $S_{M-1,3}$ | $S_{M-1,4}$ | ... | ... | $S_{M-1,N-2}$ | $S_{M-1,N-1}$ | $S_{M-1,N}$ | $hP_{M-1}$ | $d1P_{M-1}$ | $d2P_{M-1}$ |
| | $S_{M-2,1}$ | $S_{M-2,2}$ | $S_{M-2,3}$ | $S_{M-2,4}$ | ... | ... | $S_{M-2,N-2}$ | $S_{M-2,N-1}$ | $S_{M-2,N}$ | $hP_{M-2}$ | $d1P_{M-2}$ | $d2P_{M-2}$ |
| Stripes | $S_{M-3,1}$ | $S_{M-3,2}$ | $S_{M-3,3}$ | $S_{M-3,4}$ | ... | ... | $S_{M-3,N-2}$ | $S_{M-3,N-1}$ | $S_{M-3,N}$ | $hP_{M-3}$ | $d1P_{M-3}$ | $d2P_{M-3}$ |
| | : | : | : | : | | | : | : | : | : | : | : |
| | : | : | : | : | | | : | : | : | : | : | : |
| | $S_{4,1}$ | $S_{4,2}$ | $S_{4,3}$ | $S_{4,4}$ | ... | ... | $S_{4,N-2}$ | $S_{4,N-1}$ | $S_{4,N}$ | $hP_4$ | $d1P_4$ | $d2P_4$ |
| | $S_{3,1}$ | $S_{3,2}$ | $S_{3,3}$ | $S_{3,4}$ | ... | ... | $S_{3,N-2}$ | $S_{3,N-1}$ | $S_{3,N}$ | $hP_3$ | $d1P_3$ | $d2P_3$ |
| | $S_{2,1}$ | $S_{2,2}$ | $S_{2,3}$ | $S_{2,4}$ | ... | ... | $S_{2,N-2}$ | $S_{2,N-1}$ | $S_{2,N}$ | $hP_2$ | $d1P_2$ | $d2P_2$ |
| | $S_{1,1}$ | $S_{1,2}$ | $S_{1,3}$ | $S_{1,4}$ | ... | ... | $S_{1,N-2}$ | $S_{1,N-1}$ | $S_{1,N}$ | $hP_1$ | $d1P_1$ | $d2P_1$ |

Fig. 5

Disks

| $d2P_{M+1}$ | $d2P_{M+2}$ | $d2P_{M+3}$ | $d2P_{M+4}$ | | $d2P_{M+N-2}$ | $d2P_{M+N-1}$ | | | |
|---|---|---|---|---|---|---|---|---|---|
| | $dIP_{M+N-1}$ | $dIP_{M+N-2}$ | $dIP_{M+N-1}$ | ... | ... | $dIP_{M+3}$ | $dIP_{M+2}$ | $dIP_{M+1}$ | |
| $S_{M,N}$ | $S_{M,N-1}$ | $S_{M,N-2}$ | $S_{M,N-3}$ | ... | ... | $S_{M,3}$ | $S_{M,2}$ | $S_{M,1}$ | $hP_M$ | $dIP_M$ | $d2P_M$ |
| $S_{M-1,N}$ | $S_{M-1,N-1}$ | $S_{M-1,N-2}$ | $S_{M-1,N-3}$ | ... | ... | $S_{M-1,3}$ | $S_{M-1,2}$ | $S_{M-1,1}$ | $hP_{M-1}$ | $dIP_{M-1}$ | $d2P_{M-1}$ |
| $S_{M-2,N}$ | $S_{M-2,N-1}$ | $S_{M-2,N-2}$ | $S_{M-2,N-3}$ | ... | ... | $S_{M-2,3}$ | $S_{M-2,2}$ | $S_{M-2,1}$ | $hP_{M-2}$ | $dIP_{M-2}$ | $d2P_{M-2}$ |
| $S_{M-3,N}$ | $S_{M-3,N-1}$ | $S_{M-3,N-2}$ | $S_{M-3,N-3}$ | ... | ... | $S_{M-3,3}$ | $S_{M-3,2}$ | $S_{M-3,1}$ | $hP_{M-3}$ | $dIP_{M-3}$ | $d2P_{M-3}$ |
| : | : | : | : | | | : | : | : | : | : | : |
| $S_{4,N}$ | $S_{4,N-1}$ | $S_{4,N-2}$ | $S_{4,N-3}$ | ... | ... | $S_{4,3}$ | $S_{4,2}$ | $S_{4,1}$ | $hP_4$ | $dIP_4$ | $d2P_4$ |
| $S_{3,N}$ | $S_{3,N-1}$ | $S_{3,N-2}$ | $S_{3,N-3}$ | ... | ... | $S_{3,3}$ | $S_{3,2}$ | $S_{3,1}$ | $hP_3$ | $dIP_3$ | $d2P_3$ |
| $S_{2,N}$ | $S_{2,N-1}$ | $S_{2,N-2}$ | $S_{2,N-3}$ | ... | ... | $S_{2,3}$ | $S_{2,2}$ | $S_{2,1}$ | $hP_2$ | $dIP_2$ | $d2P_2$ |
| $S_{1,N}$ | $S_{1,N-1}$ | $S_{1,N-2}$ | $S_{1,N-3}$ | ... | ... | $S_{1,3}$ | $S_{1,2}$ | $S_{1,1}$ | $hP_1$ | $dIP_1$ | $d2P_1$ |

Stripes

Fig. 6

METHOD AND SYSTEM FOR THREE DISK FAULT TOLERANCE IN A DISK ARRAY

BACKGROUND OF THE INVENTION

1. Field of the Invention

The present invention is generally related to disk array architectures, and, specifically, to disk array architectures that provide disk fault tolerance.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array.

In addition, other schemes have been proposed to implement two disk fault protection, such as the scheme described in U.S. Pat. No. 6,353,895. While these schemes provide fault tolerance in the case of two simultaneous disk failures, the techniques are not readily scalable to accommodate more than two simultaneous drive failures, such as a three drive failure. Importantly, as the number of drives in an array becomes increasingly larger, the statistical probability of more than two disks failing simultaneously increases and, consequently, more than two drive fault tolerance is required. However, it is believed that three drive fault recovery techniques have not been used in disk array architectures or RAID systems.

Thus, it would be desirable to provide system and method for implementing a three disk fault recovery architecture that is not subject to complex and computationally time-consuming array control functions encountered in known disk fault tolerance implementations. In addition, it would also be desirable to provide a method that does not limit the size or configuration of the array. Further, it would be desirable to limit the number of additional disks required to implement three disk fault tolerance.

BRIEF SUMMARY OF THE INVENTION

Generally, the present invention fulfills the foregoing needs by providing in one aspect thereof, a method for providing three disk fault tolerance in an array of disks indexed and organized into a plurality of indexed stripes, each stripe including strips indexed by both disk and stripe, and each of the strips being located on a single disk. The method includes arranging strips containing data into horizontal and diagonal parity sets, each parity set including at least one data strip as a member and no single data strip being repeated in any one parity set. The method also includes grouping the diagonal parity sets into two groups—Group 1 and Group 2—such that each data strip is a member of a unique diagonal parity set in Group 1 and also a member of another unique diagonal parity set in Group 2. The method further includes calculating a horizontal parity for each horizontal parity set and calculating a diagonal parity for each diagonal parity set. The method also includes storing the calculated horizontal parity of each horizontal parity set in a strip of a horizontal parity disk. The method further includes storing at least some of the calculated diagonal parities of each diagonal parity set in corresponding strips of a diagonal parity disk, and storing the remainder of the calculated diagonal parities in corresponding strips on a diagonal parity stripe so that each diagonal parity is stored in a strip of the diagonal parity stripe with a disk index different from all the members of its contributing diagonal parity set.

The present invention further provides, in another aspect thereof, a system for providing disk fault tolerance in an array of independent disks. The system includes an array of disks consecutively indexed and organized into indexed stripes. Each stripe further includes strips indexed by both disk and stripe, and each of the strips in any one of the stripes being located on a single disk. The system further includes an array controller coupled to the disk array and configured to arrange the strips containing data into horizontal and diagonal parity sets, with each set including at least one data strip as a member. The array controller is also configured to group the diagonal parity sets into two groups of diagonal parity sets—Group 1 and Group 2. The array controller is further configured to calculate the corresponding horizontal and diagonal parities for each of the parity sets, and to store each of the calculated parities in a corresponding strip.

BRIEF DESCRIPTION OF THE DRAWINGS

The features and advantages of the present invention will become apparent from the following detailed description of the invention when read with the accompanying drawings in which.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

Figure 1:
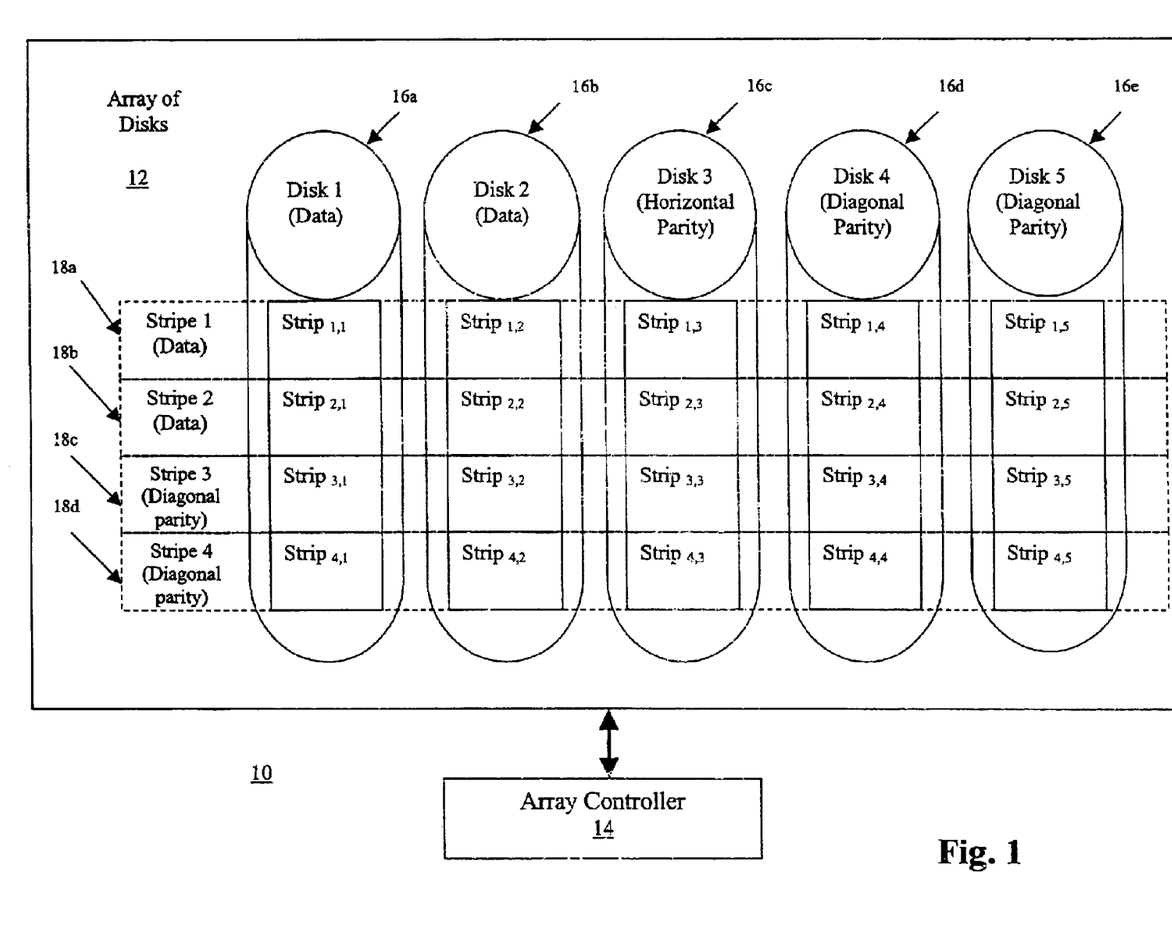
FIG. 1 illustrates a block diagram representation of a data storage system including an array controller and an array of disks.

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture. The array controller 14, coupled to array of disks 12, allocates logical units, or strips, into logical rows, or stripes, extending across the physical disks in the array 12. According to one aspect of the invention, each disk in the array 12 is consecutively indexed, each stripe in the array 12 is consecutively indexed, and each strip is indexed according to the corresponding disk and stripe membership. For example, the array 12 depicted in FIG. 1 includes five disks, disks 1–5 (16a–16e), allocated with four stripes, stripes 1–4 (18a–18d), so that each disk includes four strips indexed by both disk and stripe membership, and each stripe includes five strips allocated across the disks. Although FIG. 1, for the sake of simplicity of illustration, illustrates a five disk array 12 having two data disks (16a, 16b) and configured to include four stripes (18a–18d), it will be understood that the present invention is not limited to a specific number of disks (such as the number of data disks being one less than a prime number) and stripes, nor is it limited to a square data disk configuration ("N×N" data disks).

In one aspect of the invention, the array 12 is mapped by the array controller 14 to reserve three disks for storing array reconstruction information. In addition, the mapping includes a reservation of two stripes for storing additional reconstruction information. For example, the highest indexed three disks, disk 3–5 (16c–16e), can be reserved for storing horizontal parity information, diagonal parity information corresponding to diagonal parity sets of Group 1, and diagonal parity information corresponding to diagonal parity sets of Group 2 respectively. In addition, the highest indexed stripes, stripe 3 and 4 (18c and 18d), can be reserved for storing diagonal parity information corresponding to diagonal parity sets of Group 1, and diagonal parity information corresponding to diagonal parity sets of Group 2 respectively. The remaining disks in the array, disks 1 and 2 (16a and 16b), can then be used to store data.

Figure 2:
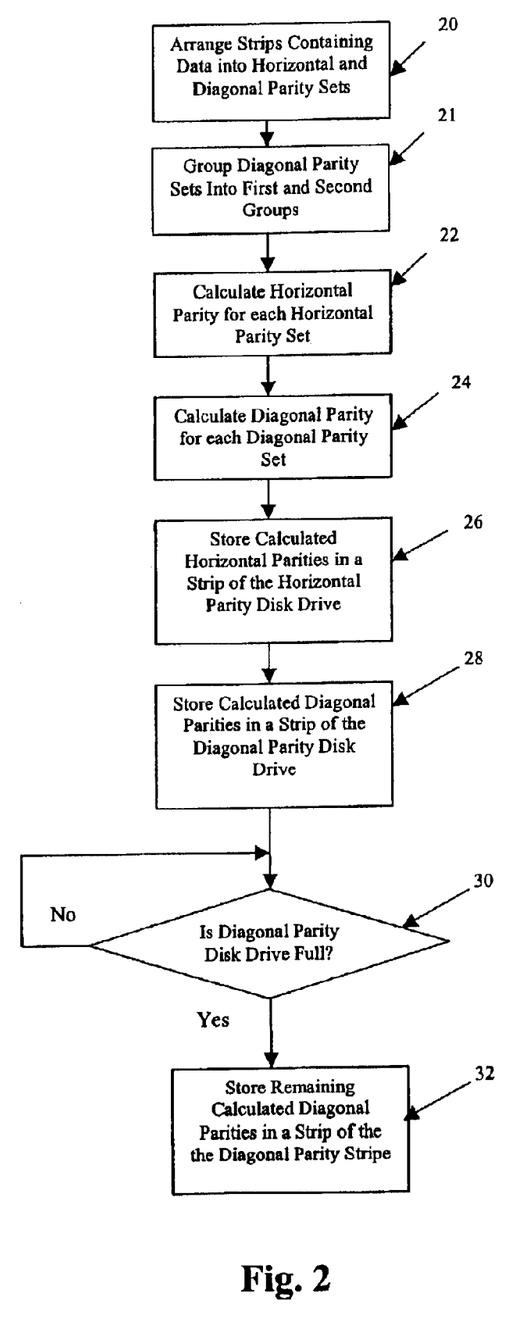
FIG. 2 is a flow chart illustrating a method of providing disk fault tolerance in an array of disks.

FIG. 2 is a flow chart illustrating a method of providing disk fault tolerance in an array of disks allocated as described above. The method can by implemented by the array controller 14, coupled to the array 12, and configured to perform the corresponding method steps. The method includes arranging strips containing data into horizontal and diagonal parity sets 20. For example, horizontal parity sets can be assembled across each stripe of the array containing data, and diagonal parity sets can be assembled across diagonals traversing the stripes in the army that contain data. In an aspect of the invention, the diagonal parity sets can be assembled across diagonals traversing the stripes in one direction, and additional diagonal parity sets can be assembled across diagonals traversing the stripes in a different direction. In a further embodiment, diagonal parity sets can be assembled by establishing a first diagonal parity set as the data strip having the lowest disk and stripe index. Then, consecutive diagonal parity sets can be established by diagonally assembling the data strips adjacent to the previously established diagonal parity set until each data strip has been assembled into a respective diagonal parity set In another embodiment, the diagonal parity sets can be assembled by establishing a first diagonal parity set as the data strip having the highest disk containing data and lowest stripe index. Then, consecutive diagonal parity sets can be established by diagonally assembling the data strips adjacent to the previously established diagonal parity set, proceeding in a lower disk index, higher stripe index direction. In one aspect of the invention, each parity set comprises at least one data strip as a member, and no single data strip is repeated in any one parity set. For example, a single data strip contributes to only one horizontal parity set, and once to a unique diagonal parity set in Group 1 and a unique diagonal parity set in Group 2. After the parity sets have been assembled, the diagonal parity sets can be further grouped into two groups of diagonal parity sets; Group 1 corresponding to the diagonal parity sets assembled across diagonals traversing the stripes in one direction, and Group 2 corresponding to the diagonal parity sets assembled across diagonals traversing the stripes in a different direction. In an aspect of the invention, the parity sets are grouped so that each data strip is a member of a unique diagonal parity set in Group 1 and a member of a unique diagonal parity set in Group 2.

Once the horizontal parity sets have been assembled, the horizontal parity for each horizontal parity set is calculated 22 using known parity algorithms. For example, a simple exclusive (XOR) of the information stored in each member of the horizontal parity set can be used to calculate the respective parity for each horizontal parity set. Similarly, once the diagonal parity sets have been assembled and grouped, the diagonal parities of diagonal parity sets in Group 1 and Group 2 can be calculated 24 using known parity algorithms, such as an XOR technique.

After the parities for the both the horizontal and diagonal parity sets are calculated, the parities are stored in the array so that data and parity information can be reconstructed in the event of a disk failure, such as the loss of three disks simultaneously. In an aspect of the invention, the parities are stored in reserved strips of the array, while the remaining unreserved strips are used for storing data. For example, a disk is reserved to store horizontal parity information, and two disks are reserved to store diagonal parity information corresponding to the two groups of diagonal parity sets, Group 1 and Group 2 respectively. In a further embodiment, two stripes of the array are reserved to store additional diagonal parity information corresponding to the two groups of diagonal parity sets, Group 1 and Group 2 respectively.

The calculated horizontal parity of each horizontal parity set can be stored in a reserved strip of the horizontal parity disk 26. For example, the horizontal parity for each horizontal parity set grouped in a stripe containing data can be stored in a strip of the corresponding stripe of the horizontal parity disk. Next, the calculated diagonal parity of each diagonal parity set is stored in a reserved strip of a diagonal parity disk 28. For example, the diagonal parity for each diagonal parity set in the array can be stored in strips of the diagonal parity disks. If the diagonal parity disk is filled 30 before all of the parities of the respective diagonal parity sets have been stored, then the remaining diagonal parities are stored 32 in a strip of a diagonal parity stripe having a different disk index than the disk indexes of all contributing data strips of the corresponding diagonal parity set.

In one aspect of the invention, the calculated diagonal parities, beginning with the parity for the first diagonal parity set of Group 1, are sequentially stored in respective strips of the diagonal parity disk reserved for Group 1. When the diagonal parity strip on the highest indexed stripe containing data is filled, the sequentially calculated diagonal parities are further stored, beginning with the strip on the lowest indexed disk, in the diagonal parity stripe reserved for Group 1. This process is continued until the remaining calculated diagonal parities for each of the diagonal parity sets of Group 1 have been stored.

Similarly, the calculated diagonal parities, beginning with the parity for the first diagonal parity set of Group 2, are sequentially stored in respective strips of the diagonal parity disk reserved for Group 2. When the diagonal parity strip on the highest indexed stripe containing data is filled, the sequentially calculated diagonal parities are further stored (beginning with the strip on the highest indexed disk containing data) in the diagonal parity stripe reserved for the diagonal parity sets of Group 2. This process is continued until the remaining calculated diagonal parities for each of the diagonal parity sets of Group 2 have been stored.

In another embodiment, the diagonal parity sets can be grouped into Group 1 starting with the strip on the highest indexed disk containing data and lowest indexed stripe containing data, and into Group 2 starting with the strip on the lowest indexed stripe containing data and the lowest indexed disk containing data. In another embodiment, the diagonal parity sets can be grouped into Group 1 starting at the lowest indexed disk containing data and highest indexed stripe, and into Group 2 starting at the highest indexed disk containing data and highest indexed stripe. Alternatively, the diagonal parity sets can be grouped into Group 2 starting at the lowest indexed disk containing data and highest indexed stripe, and Group 1 starting at the highest indexed disk containing data and highest indexed stripe. It should be understood that other arrangements may be devised for arranging parity sets and storing parities by one skilled in the art without departing from the scope of the invention, provided that diagonal parities corresponding to a respective diagonal parity set are not stored in disks that include members of the constituent diagonal parity set.

I. Creating the Logical Data and Parity Array

Figure 3:
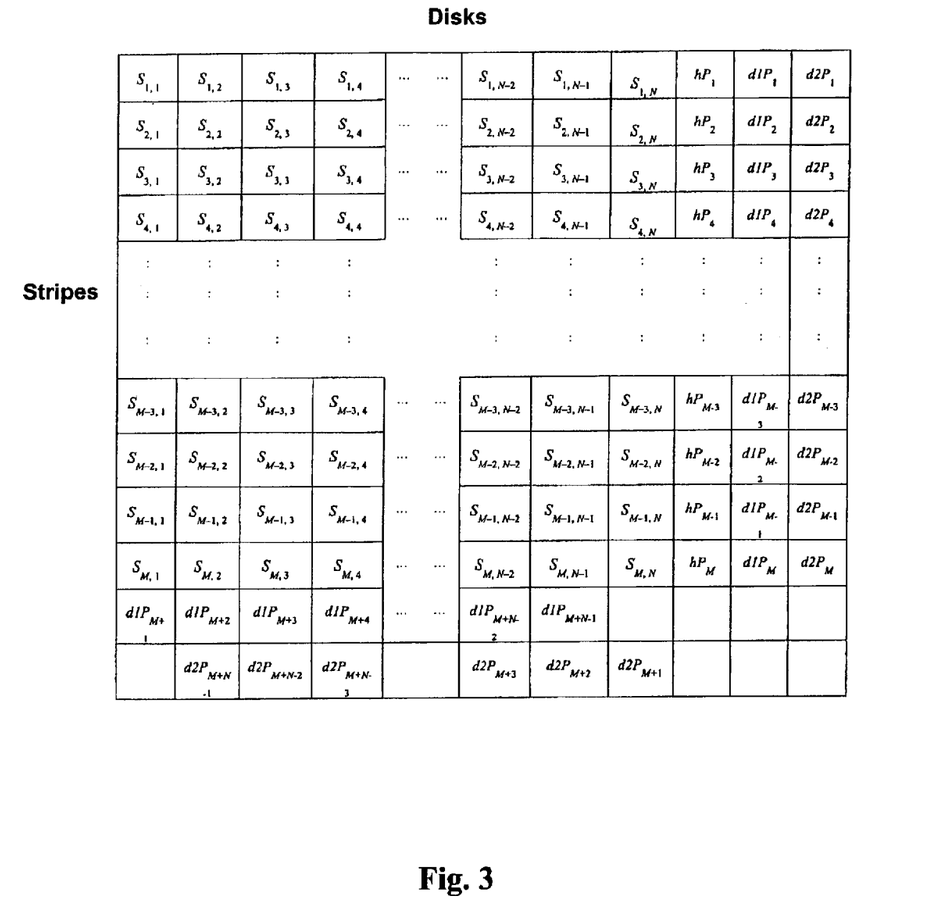
FIG. 3 illustrates an exemplary disk array storage format to implement disk fault tolerance using horizontal and diagonal parity.

FIG. 3 illustrates an exemplary disk array storage format to implement disk fault tolerance using horizontal and diagonal parity. In the two dimensional arrangement of FIG. 3, a column represents a disk, $d_i$, having index i, with each cell in a column representing a strip in the disk. In addition, $S_{m,n}$ represents a data strip having a data stripe index of m and a data disk index of n, $hP_i$ represents a horizontal parity strips having index i, $d1P_i$ represents a diagonal parity strip corresponding to a diagonal parity set in Group 1 having index i, and $d2P_i$ represents a diagonal parity strip corresponding to a diagonal parity set in Group 2 having index i. The rows in FIG. 3 represent the stripes in the array. In an aspect of the invention, the first N disks are data disks, and the last three disks (N+1, N+2, N+3) are parity disks. For example, disk N+1 is used to store horizontal parity, hP, and disk N+2 and N+3 are used to store diagonal parities, d1P and d2P, respectively. In another aspect of the invention, the first M stripes in the array are used to store data, and stripes M+1 and M+2, which include the last two strips on each of the first N data disks, are used to store additional diagonal parity information. In particular, M+1 is used to store parity for diagonal parity sets in Group 1 and M+2 is used to store parity for diagonal parity sets in Group 2. Accordingly, disks 1 to N are used for storing data in stripes 1 to M.

In one aspect of the invention, each horizontal parity set is arranged from the data stored in each stripe. The parity for each of the horizontal sets is stored in the corresponding strip of the respective stripe in the horizontal parity disk. For example, the first horizontal parity set is assembled as $S_{1,1}$ to $S_{1,N}$, and the parity for the set is stored in strip $hP_1$. In another aspect of the invention, diagonal parity sets are arranged across diagonals traversing stripes containing data, and the parity for each of the diagonal groups is stored in a strip in a diagonal parity disk and, when the diagonal parity disk is full, the remaining parities are stored in a diagonal parity stripe. For example, the first diagonal parity set of Group 1 is assembled as $S_{1,1}$, and the parity for the set is stored in strip $d1P_1$ The second diagonal parity set is assembled as $S_{2,1}$ and $S_{1,2}$ and the parity for the set is stored in strip $d1P_2$. The next adjacent data strips are assembled diagonally, and the process continues until the diagonal parity disk reserved for Group 1 is filled (i.e., diagonal parities for diagonal parity sets up to index M.) For the next diagonal parity set, (i.e., diagonal parity group having index M+1) the diagonal parity is stored in a strip of the first diagonal parity stripe so that all the contributing data strips of the diagonal parity set are at least one strip to the right of the strip used to store the diagonal parity for that set. The process of filling the diagonal parity stripe continues in this manner until the parities for the remaining diagonal parity sets of Group 1 are stored. (i.e., the diagonal parity set ending with set $S_{M,N}$.).

Similarly, the first diagonal parity set of Group 2 is assembled as $S_{1,N}$ and the parity for the set is stored in strip $d2P_1$. The second diagonal parity set is assembled as $S_{1,N-1}$ and $S_{2,N}$ and the parity for the set is stored in strip $d2P_2$. The next adjacent data strips are assembled diagonally, and the process continues until the diagonal parity disk reserved for Group 2 is filled (i.e., diagonal parities for diagonal parity sets up to index M.) For the next diagonal parity set, (i.e., diagonal parity group having index M+1) the diagonal parity is stored in a strip of the second diagonal parity stripe so that all the contributing data strips of the diagonal parity set are at least one strip to the left of the strip used to store the diagonal parity for that set. The process of filling the diagonal parity stripe continues in this manner until the parities for the remaining diagonal parity sets for Group 2 are stored. (i.e., the diagonal parity set ending with set $S_{M,1}$).

In a further aspect of the invention, the parities for each parity set are calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set of Group 1, the diagonal parity, $d1P_i$, is calculated according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-N+2,N-1} \oplus S_{i-N+3,N-2} \oplus \ldots S_{i,1}, \text{ for } N \leq i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

For each diagonal parity set of the Group 2, the diagonal parity, $d2P_i$, is calculated according to the equations:

$$d2P_i = S_{1,N-i+1} \oplus S_{2,N-i+2} \oplus S_{3,N-i+3} \oplus \ldots S_{i,N}, \text{ for } i \leq N;$$

$$d2P_i = S_{i-N+1,1} \oplus S_{i-N+2,2} \oplus S_{i-N+3,3} \oplus \ldots S_{i,N}, \text{ for } N < i \leq M; \text{ and}$$

$$d2P_i = S_{i-N+1,1} \oplus S_{i-N+2,2} \oplus S_{i-N+3,3} \oplus \ldots S_{M,M+N-i}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

Figure 4:
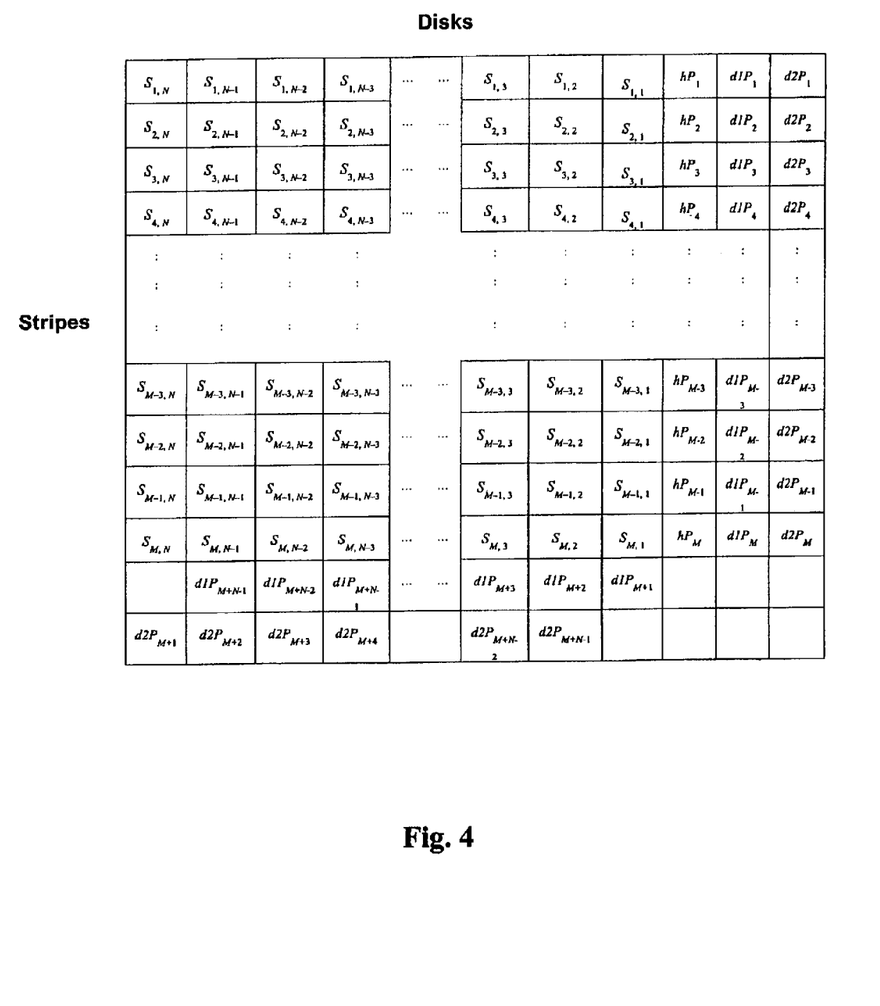
FIG. 4 illustrates a disk array storage format wherein the strips containing data are indexed starting from highest indexed disk containing data and the lowest indexed stripe.
Figure 5:
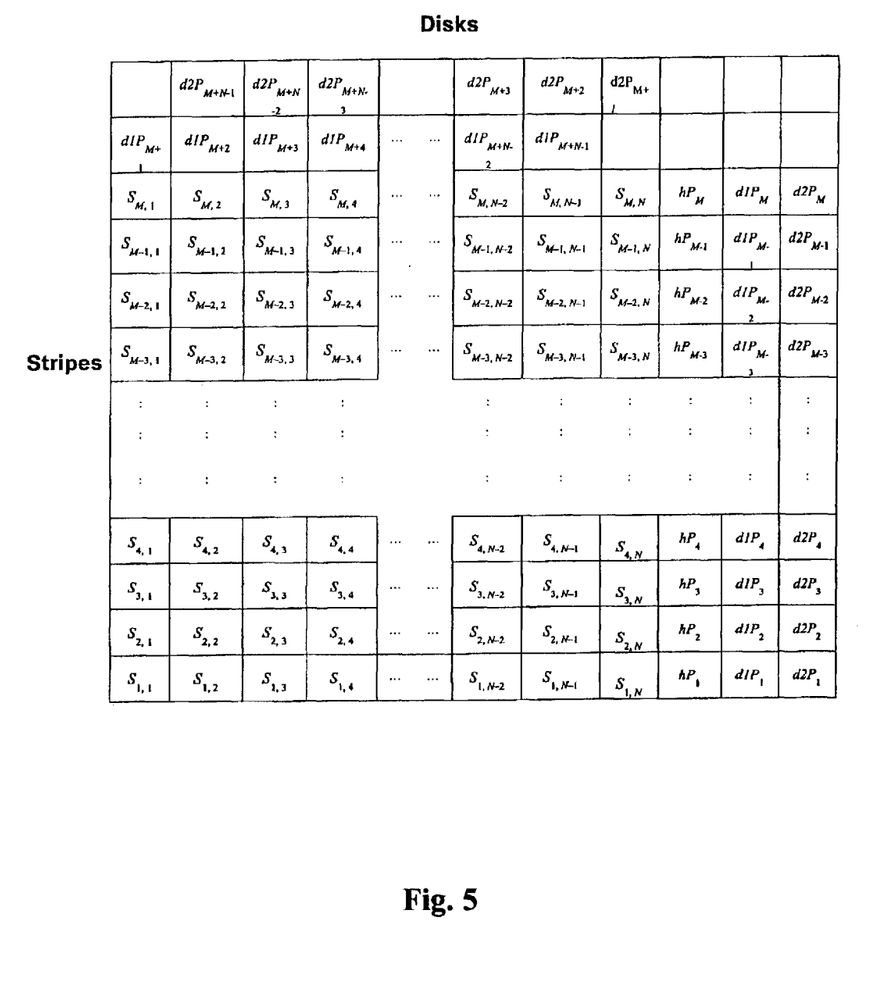
FIG. 5 illustrates a disk array storage format wherein the strips containing data are indexed starting from lowest indexed disk and the highest indexed stripe.
Figure 6:
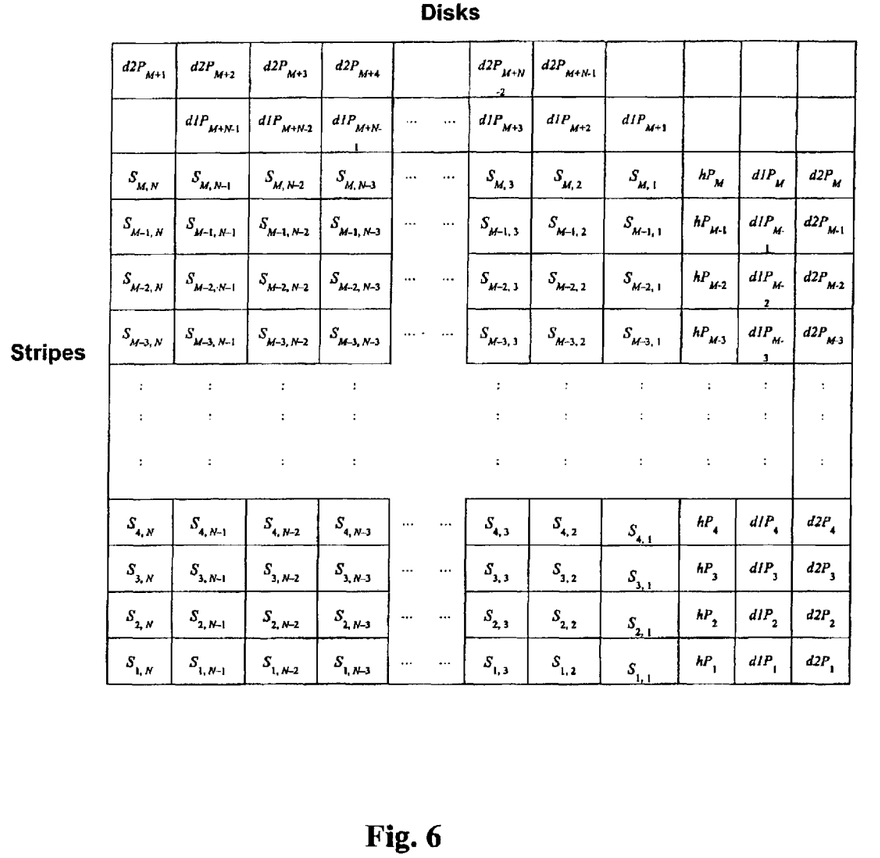
FIG. 6 illustrates a disk array storage format wherein the strips containing data are indexed starting from highest indexed disk containing data and the highest indexed stripe.

FIGS. 4–6 illustrate embodiments for grouping parity sets and placing the resulting parity information in the array. In each of the embodiments, the formulas previously described are used to calculate the respective parity for each parity set. FIG. 4 illustrates a disk array storage format wherein the strips containing data are indexed starting from the highest indexed disk containing data and the lowest indexed stripe. The data is then assembled into parity sets and the party for each set is calculated and stored according to the formulas described above.

FIG. 5 illustrates a disk array storage format wherein the strips containing data are indexed starting from the lowest indexed disk and the highest indexed stripe. In addition, the diagonal parity stripe reserved for diagonal parity sets in Group 2 and the diagonal parity stripe reserved for diagonal parity sets in Group 1 can be positioned as the first and second stripes in the array respectively. The data is then assembled into parity sets and the parity for each set is calculated and stored according to the previously described formulas.

FIG. 6 illustrates a disk array storage format wherein the strips containing data are indexed starting from the highest indexed disk containing data and the highest indexed stripe. In addition, the diagonal parity stripe reserved for diagonal parity sets in Group 2 and the diagonal parity stripe reserved for diagonal parity sets in Group 1 can be positioned as the first and second stripes in the array respectively. The same formulas described above are then used to calculate and store the parity information to allow reconstruction of the data and parity.

In yet another aspect of the invention, the horizontal and diagonal parity columns can be positioned to the left or right of the N data disks. Thus, a variety of formatting schemes using horizontal and diagonal parities can be used by one skilled in the art to create the fault tolerant disk array using the techniques of the invention.

II. Recovering Data and Parity in the Array

Once the data is stored in the array according to the previous section, data and parity can be efficiently recovered for disk failure events, such as the simultaneous failure of three disks in the array. By using the stored horizontal parity, the stored diagonal parity, and the remaining data on the disks, the information on failed disks can be efficiently and quickly recreated. The following Sections A through F describe all potential combinations of three drive failures in the array and the reconstruction steps necessary to reconstruct the array having the architecture described in FIG. 3. The reconstruction processes described in sections A through F for the array architecture of FIG. 3 can be easily modified by one skilled in the art to accommodate three disk failure reconstruction for the array architectures described in FIG. 4, 5, or 6 (or permutations of these array architectures).

A. Failure of Horizontal, First Diagonal, and Second Diagonal Parity Disks

In the case of the failure of the horizontal parity disk and the diagonal parity disks, the reconstruction of the parities is straightforward. Since the data disks remain intact, the horizontal parity for each horizontal parity set is recalculated and restored, and the diagonal parity for each diagonal parity set is recalculated and restored in the respective diagonal parity disk and diagonal parity stripe.

B. Failure of a Data Disk, and Both Diagonal Parity Disks

In the case of the failure of a data disk and both diagonal parity disks, reconstructing the lost data includes reconstructing each of the data strips of the failed data disk, starting with the strip on the lowest indexed stripe, by using the corresponding horizontal parity from the intact horizontal parity disk and the other members of the corresponding horizontal parity set, and proceeding up to the last data strip. Next, if the failed data disk index is less than the highest indexed data disk in the array (for example, in a 8 disk array with the architecture described in FIG. 3 the highest indexed data disk is disk 5), the diagonal parity strip in the first parity stripe of the failed data disk is reconstructed by using the members of the corresponding diagonal parity set. If the failed data disk index is greater than the lowest indexed disk in the array, the diagonal parity strip in the second parity stripe of the failed data disk is reconstructed by using the members of the corresponding diagonal parity set. Finally, each of the parity strips of the failed diagonal parity disks is reconstructed by using the members of the corresponding diagonal parity sets.

In FIG. 3 for example, the strips of a failed disk $d_i$ are reconstructed starting with strip $S_{1,i}$ and proceeding to $S_{M,i}$ using the corresponding horizontal parity information in the horizontal parity disk and other members of the corresponding horizontal parity set Next, if i<N, the diagonal parity $d1P_{M+i}$ in the first diagonal parity stripe is reconstructed using the corresponding data strips which are intact, because the failed data disk $d_i$ does not contribute members to calculation of the diagonal parity $d1P_{M+i}$. If i>1, the diagonal parity $d2P_{M+N+1-i}$ in the second diagonal parity stripe is reconstructed using the corresponding data strips which are intact, because the failed data disk $d_i$ does not contribute members to calculation of the diagonal party $d2P_{M+N+1-i}$. Finally, the diagonal parity disks are reconstructed using the previously intact data disks and the data disk $d_i$ that has been reconstructed.

C. Failure of a Data Disk, the Horizontal Parity Disk, and One Diagonal Parity Disk In the case of the failure of a data disk, the horizontal parity disk, and one of the diagonal parity disks, reconstructing the lost data includes reconstructing each of the data strips of the failed data disk, starting with the strip on the lowest indexed stripe, by using the corresponding diagonal parity from the intact diagonal parity disk and the other members of the corresponding diagonal parity set. Then, if the failed data disk index is less than the highest indexed data disk in the array, the diagonal parity strip in the first parity stripe of the failed disk is reconstructed by using the members of the corresponding diagonal parity set. If the failed data disk index is greater than the lowest indexed disk in the array, the diagonal parity strip in the second parity stripe of the failed disk is reconstructed by using the members of the corresponding diagonal parity set. Finally, each of the horizontal parity strips of the failed horizontal parity disk is reconstructed by using the members of the corresponding horizontal parity set.

In FIG. 3 for example, the strips of a failed disk $d_i$ are reconstructed starting with strip $S_{1,i}$ and proceeding to $S_{M,i}$ using diagonal parity information. If i<N, the diagonal parity $d1P_{M+i}$ in the first diagonal parity stripe is reconstructed using the corresponding data strips which are intact, because the failed data disk $d_i$ does not contribute members to calculation of the diagonal parity $d1P_{M+i}$. If i>1, the diagonal parity $d2P_{M+N+1-i}$ in the second diagonal parity stripe is reconstructed using the corresponding data strips which are intact, because the failed data disk $d_i$ does not contribute members to calculation of the diagonal party $d2P_{M+N+1-i}$. Finally, the horizontal parity disk is reconstructed using the previously intact data disks and the data disk that has been reconstructed.

D. Failure of Two Data Disks and a Diagonal Parity Disk

In the case of two failed data disks (where one disk has a lower index, and the other disk has a higher index) and a failed second diagonal parity disk (i.e., disk reserved for storing the parities of diagonal parity sets of Group 2), data is reconstructed by starting at the strip on the lowest indexed stripe of the lower index failed data disk followed by the strip on the lowest indexed stripe of the higher index failed data disk. The data strip of the lower indexed failed data disk is recreated by using the corresponding diagonal parity and the other members of the corresponding diagonal parity set of Group 1. The data strip of the higher indexed failed data disk is then reconstructed by using the corresponding horizontal parity and the other members of the corresponding horizontal parity set The process is repeated—alternating between the two failed data disks—until each data strip in each of the failed data disks is reconstructed. Finally, each of the diagonal parity strips of the failed data disks is reconstructed by using the members of the corresponding diagonal parity set.

In FIG. 3 for example, the disk having a lower index is designated as $d_i$, and the disk having a higher index is designated $d_k$. Thus i<k. The data in strip $S_{1,i}$ is reconstructed using the corresponding diagonal parity set of Group 1. This is possible because the strips contributing to the diagonal parity set of Group 1 for $S_{1,i}$ all occur to the left of disk $d_i$ or on the corresponding first diagonal parity disk (i.e., disk reserved for storing parities of diagonal parity sets of Group 1), which is intact. Then, strip $S_{1,k}$ is reconstructed using the corresponding horizontal parity information. Next, strip $S_{2,i}$ is reconstructed using the corresponding diagonal parity set of Group 1, followed by strip $S_{2,k}$ using the corresponding horizontal parity information. This reconstruction process is alternated between the two disks.

In general, for any arbitrary value of r<N+M, the strips in the diagonal parity set of Group 1 required to reconstruct strip $S_{r,i}$ are guaranteed to be available because these strips are in rows less than r on disks to the right of strip $S_{r,i}$ and on rows greater than r on disks to the left of strip $S_{r,i}$. At this point, the only potentially unavailable data strip required for this purpose is on disk $d_k$. However, since disk $d_k$ is located to the right of disk $d_i$, the required data strip would have been already reconstructed using the described technique before arriving at strip $S_{r,i}$. Furthermore, the diagonal parity strip required to reconstruct strip $S_{r,i}$ is either located on the first diagonal parity disk or is located on a disk to the left of the first diagonal parity disk, wherein the required disks are intact. Once all the data strips have been reconstructed, the corresponding diagonal parity strips are recreated as needed and the failed second diagonal parity disk is recreated using the members of the corresponding diagonal parity set.

In the case of two failed disks (where one disk has a lower index, and the other disk have a higher index) and a failed first diagonal parity disk; data is reconstructed by starting at the strip on the lowest indexed stripe of the higher indexed failed data disk followed by the strip on the lowest indexed stripe of the lower indexed failed data disk. The data strip of the higher indexed failed data disk is recreated by using the corresponding diagonal parity and the other members of the corresponding diagonal parity set of Group 2. The data strip of the lower indexed failed data disk is then reconstructed by using the corresponding horizontal parity and the other members of the corresponding horizontal parity set. The process is repeated—alternating between the two failed data disks—until each data strip in each of the failed data disks is reconstructed. Finally, each of the diagonal parity strips of the failed data disks is reconstructed by using the members of the corresponding diagonal parity set.

In FIG. 3 for example, the disk having a lower index is designated as $d_i$, and the disk having a higher index is designated $d_k$. Thus i<k. The data in each failed disk is alternately reconstructed starting with strip $S_{1,k}$ using the corresponding diagonal parity set of Group 2. This is impossible because the strips contributing to the diagonal parity for $S_{1,k}$ all occur to the right of disk $d_k$, or on the second diagonal parity disk, wherein all contributing strips are intact. Next, strip $S_{1,i}$ is reconstructed using the corresponding horizontal parity information. Then, strip $S_{2,k}$ is reconstructed using the corresponding diagonal parity set of Group 2, followed by reconstruction of strip $S_{2,i}$ using the corresponding horizontal parity information. In general, the strips in the diagonal parity set of Group 2 required to reconstruct strip $S_{r,k}$ for some arbitrary r<N+M, is guaranteed to be available since the strips are in rows less than r on disks to the left of strip $S_{r,k}$ and on rows greater than r on disks to the right of strip $S_{r,k}$. Now, the only potentially unavailable data strip required for this purpose is located on disk $d_i$. However, since disk $d_i$ is located to the left of disk $d_k$, the required data strip would have been already reconstructed using described technique before arriving at strip $S_{r,k}$. Furthermore, the diagonal parity strip required to reconstruct strip $S_{r,k}$ is either located on the second diagonal parity disk or located on a disk to the right of the second diagonal parity disk, wherein the disks are intact Once all the data strips have been reconstructed, the corresponding diagonal parity strips are recreated as needed and the failed first diagonal parity disk is recreated using the members of the corresponding diagonal parity set.

E. Failure of Two Data Disks and a Horizontal Parity Disk

In the case of two failed disks, where one disk has a lower index, and the other disk having a higher index, and a horizontal parity disk, data is reconstructed by starting at the strip on the lowest indexed stripe of the lower indexed failed data disk followed by the strip on the lowest indexed stripe of the higher indexed failed data disk. The data strip of the lower indexed failed data disk is reconstructed by using the corresponding diagonal parity and the other members of the corresponding diagonal parity set of Group 1. Then, the data strip of the higher indexed failed data disk is reconstructed by using the corresponding diagonal parity and the other members of the corresponding diagonal parity set of Group 2. The reconstruction process is repeated—alternating between the two failed data disks—until each data strip on each of the failed data disks is reconstructed. Next, each of the diagonal parity strips of the failed data disks is reconstructed using the members of the corresponding diagonal parity set. Finally, each of the strips of the failed horizontal parity disk is reconstructed by using the members of the corresponding horizontal parity set.

In FIG. 3 for example, the disk having a lower index is designated as $d_i$, and the other disk having a higher index is designated $d_k$. Thus i<k. The data in each failed disk is alternately reconstructed starting with strip $S_{1,i}$ using the corresponding diagonal parity set of Group 1. This reconstruction is possible because the strips contributing to the diagonal parity for $S_{1,I}$ all occur to the left of disk $d_I$ or on the unique first diagonal parity disk, wherein the necessary strips are intact. Next, strip $S_{i,k}$ is reconstructed using the corresponding diagonal parity set of Group 2. This reconstruction is possible because the strips contributing to the diagonal parity for $S_{1,k}$ all occur to the right of disk $d_k$ or on the unique second diagonal parity disk, wherein the necessary strips are intact. Next, strip $S_{2,I}$ is reconstructed using the corresponding diagonal parity set of Group 1. Then, strip $S_{2,k}$ is reconstructed using the corresponding diagonal parity set of Group 2. In general, the strips in the diagonal parity set of Group 1 required to reconstruct strip $S_{r,i}$ for some arbitrary value of r<N+M, are guaranteed to be available since the strips are in rows less than r on disks to the right of it and on rows greater than r on disks to the left of it. The only potentially unavailable data strip required to reconstruct strip $S_{r,i}$ for r<N+M, can be located on disk $d_k$. However, since disk $d_k$ is located to the right of disk $d_I$, the required data strip would have been already reconstructed using the described scheme before arriving at strip $S_{r,i}$.

Similarly, the strips in the diagonal parity set of Group 2 required to reconstruct strip $S_{r,k}$ for some arbitrary value of r<N+M, is always guaranteed to be available since the strips are in rows less than r on disks to the left of it and on rows greater than r on disks to the right of it. At this point, the only potentially unavailable data strip required for this purpose can be located on disk $d_I$. However, since disk $d_i$ is located to the left of disk $d_k$, the required data strip would have been already reconstructed using this scheme before we arrive at strip $S_{r,k}$. Furthermore, the diagonal parity strip required to reconstruct strip $S_{r,i}$ is either located on the first diagonal parity disk or is located on a disk to the left of disk $d_i$, wherein the disks are intact. Similarly, the diagonal parity strip required to reconstruct strip $S_{r,k}$ is either located on the second diagonal parity disk or on a disk to the right of disk $d_k$ wherein the disks are intact. Finally the applicable diagonal parity strips on the disks $d_I$, and $d_k$ and the horizontal parity disk are reconstructed using the appropriate data strips that are now all intact.

F. Failure of Three Data Disks

In the case of three failed data disks, where one disk has a low index, one disk has an intermediate index and one disk has a high index, data is reconstructed by starting at the strip on the lowest indexed stripe of the lowest index failed data disk, followed by the strip on the lowest index stripe of the intermediate index failed data disk, and then the strip on the lowest indexed stripe of the high index failed data disk. The data strip of the lowest index failed data disk is reconstructed by using the corresponding diagonal parity and the other members of the corresponding diagonal parity set of Group 1. Then, the data strip of the highest index failed data disk is reconstructed by using the corresponding diagonal parity and the other members of the corresponding diagonal parity set of Group 2. Next, the data strip of the intermediate index failed data disk is reconstructed by using the corresponding horizontal parity and the other members of the corresponding horizontal parity set. This reconstruction process is repeated in a round robin fashion until each data strip each of the failed disks is reconstructed. Finally, each of the diagonal parity strips of the failed data disks are reconstructed by using the members of the corresponding diagonal parity set.

In FIG. 3 for example, the disk having a low index is designated as $d_i$, the disk having the intermediate index is designated $d_j$, and the disk having the high index is designated $d_k$. Thus, i<j<k. The data in strip $S_{1,i}$ is reconstructed using the corresponding diagonal parity set of Group 1. This is possible because the strips contributing to the diagonal parity for $S_{1,j}$ all occur to the left of disk $d_i$ or on the first diagonal parity disk, wherein the necessary disks are intact. Then, strip $S_{1,k}$ is reconstructed using the corresponding diagonal parity set of Group 2. Again, this is possible because the strips contributing to the diagonal parity for $S_{1,k}$ all occur to the right of disk $d_k$ or on the second diagonal parity disk, wherein the required disks are all intact. At this point, strip $S_{1,j}$ is reconstructed using the horizontal parity information.

Similarly, strip $S_{2,i}$ is reconstructed using the corresponding diagonal parity set of Group 1, then strip $S_{2,k}$ is reconstructed using the corresponding diagonal parity set of the Group 2, and then strip $S_{2,j}$ is reconstructed using the horizontal parity information. In general, for any arbitrary value of r, the strips in the diagonal parity set of Group 1 required to reconstruct strip $S_{r,i}$ and the strips in the right diagonal parity set of Group 2 required to reconstruct strip $S_{r,k}$ are guaranteed to be available for the following reason. For a given strip $S_{r,i}$, the strips on data disks needed to reconstruct $S_{r,i}$ are in rows less than r on disks to the right of the strip $S_{r,i}$ and on rows greater than r on disks to the left of strip $S_{r,i}$. The only potentially unavailable data strips required for this purpose can be located on disks $d_j$ and $d_k$. However, since disks $d_j$ and $d_k$ are located to the right of disk $d_i$, the required data strips would have been already reconstructed using the process described before arriving at strip $S_{r,i}$. Furthermore, the diagonal parity strip required to reconstruct strip $S_{r,i}$ is either located on the corresponding diagonal parity disk, or is located on a disk to the left of strip $S_{r,i}$, wherein the necessary disks are intact.

Similarly, the strips on data disks needed to reconstruct $S_{r,k}$ are in rows greater than r on disks to the right of strip $S_{r,k}$ and on rows less than r on disks to the left of strip $S_{r,k}$. The only unavailable data strips required for this purpose can be located on disks $d_i$ and $d_j$. However, since disks $d_i$ and $d_j$ are located to the left of disk $d_k$, the required data strips would have been already reconstructed using the described process before arriving at strip $S_{r,k}$. The diagonal parity strip required to reconstruct strip $S_{r,k}$ is either located on the corresponding diagonal parity disk or is located on a disk to the right of strip $S_{r,k}$, wherein the necessary disks are intact. Finally, the diagonal parity strips on the disks $d_i$, $d_j$ and $d_k$ are reconstructed using the appropriate data strips that are now intact.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of providing disk fault tolerance in an array of independent disks, wherein the disks are indexed and organized into a plurality of indexed stripes, each stripe further comprising a plurality of strips indexed by both disk and stripe, each of the strips being located on only a corresponding single disk, the method comprising:

arranging strips containing data into horizontal and diagonal parity sets, wherein each parity set comprises at least one data strip as a member and no single data strip is repeated in any one parity set;

grouping the diagonal parity sets into a first group and a second group of diagonal parity sets such that each data strip is a member of a diagonal parity set in the first group and a diagonal parity set in the second group;

calculating a horizontal parity for each horizontal parity set;

calculating a diagonal parity for each diagonal parity set;

storing each respective calculated horizontal parity of each horizontal parity set in a corresponding strip of a horizontal parity disk; and storing at least some of the calculated diagonal parities of each diagonal parity set in a respective one of a plurality of strips of a diagonal parity disk and storing a remainder of the calculated diagonal parities in a respective one of a plurality of strips in a diagonal parity stripe so that no member of the diagonal parity set has the same disk index as the disk index of the respective one of the plurality of strips of the diagonal parity stripe.

2. The method of claim 1, wherein the step of arranging strips containing data into horizontal and diagonal parity sets further comprises:

assembling horizontal parity sets in each stripe of the array containing data; and assembling diagonal parity sets across diagonals traversing the stripes in the array containing data.

3. The method of claim 2, wherein the step of assembling diagonal parity sets further comprises:

establishing a first diagonal parity set for the first group as a data strip having the lowest disk index and lowest stripe index; and establishing consecutive diagonal parity sets by diagonally assembling the data strips adjacent to the previously established diagonal parity set until each data strip has been assembled into a diagonal parity set.

4. The method of claim 2, wherein the step of grouping diagonal parity sets further comprises:

establishing a first diagonal parity set for the second group as a data strip having the highest disk index and the lowest stripe index; and establishing consecutive diagonal parity sets by diagonally grouping the data strips adjacent to the previously established diagonal parity set until each data strip has been grouped into a diagonal parity set.

5. The method of claim 2, wherein the step of assembling diagonal parity sets further comprises:

establishing a first diagonal parity set for the first group as a data strip having the highest disk and lowest stripe index; and establishing consecutive diagonal parity sets by diagonally assembling the data strips adjacent to the previously established diagonal parity set until each data strip has been assembled into a diagonal parity set.

6. The method of claim 2, wherein the step of grouping diagonal parity sets further comprises:

establishing a first diagonal parity set for the second group as a data strip having the lowest disk index and the lowest stripe index; and establishing consecutive diagonal parity sets by diagonally grouping the data strips adjacent to the previously established diagonal parity set until each data strip has been grouped into a diagonal parity set.

7. The method of claim 2, wherein the step of assembling diagonal parity sets further comprises:

establishing a first diagonal parity set for the first group as a data strip having the lowest disk index and highest stripe index; and establishing consecutive diagonal parity sets by diagonally assembling the data strips adjacent to the previously established diagonal parity set until each data strip has been assembled into a diagonal parity set.

8. The method of claim 2, wherein the step of assembling diagonal parity sets further comprises:

establishing a first diagonal parity set for the second group as a data strip having the highest disk index and the highest stripe index; and establishing consecutive diagonal parity sets by diagonally grouping the data strips adjacent to the previously established diagonal parity set until each data strip has been grouped into a diagonal parity set.

9. The method of claim 2, wherein the step of assembling diagonal parity sets further comprises:

establishing a first diagonal parity set for the first group as a data strip having the highest disk index and highest stripe index; and establishing consecutive diagonal parity sets by diagonally assembling the data strips adjacent to the previously established diagonal parity set until each data strip has been assembled into a diagonal parity set.

10. The method of claim 2, wherein the step of assembling diagonal parity sets further comprises:

establishing a first diagonal parity set for the second group as a data strip having the lowest disk index and the highest stripe index; and establishing consecutive diagonal parity sets by diagonally grouping the data strips adjacent to the previously established diagonal parity set until each data strip has been grouped into a diagonal parity set.

11. The method of claim 1, further comprising reconstituting lost data on three simultaneously failed disks by using the corresponding stored parity information and the data stored on the remaining functional disks.

12. The method of claim 11, wherein reconstructing the lost data comprises, in the case of a failed data disk, a failed first diagonal parity disk, and a failed second diagonal parity disk:

reconstructing each of the data strips of the failed data disk, starting with the strip on the lowest indexed stripe, by using the corresponding horizontal parity and the other members of the corresponding horizontal parity set;

reconstructing the diagonal parity strip in the first diagonal stripe reserved for parity of the corresponding diagonal set of the first group by using the members of the corresponding diagonal parity set of the first group if the index of the failed disk is one less than the highest data disk index;

reconstructing the diagonal parity strip in the second diagonal stripe reserved for parity of the corresponding diagonal sets of the second group by using the members of the corresponding diagonal parity set of the second group if the index of the failed disk is one more than the lowest disk index;

reconstructing each of the diagonal parity strips of the failed diagonal parity disks by using the members of the corresponding diagonal parity sets.

13. The method of claim 11, wherein reconstructing the lost data comprises, in the case of a failed data disk, a failed horizontal parity disk, and a failed first diagonal parity disk:

reconstructing each of the data strips of the failed data disk, starting with the strip on the lowest indexed stripe, by using the corresponding diagonal parity and the other members of the corresponding diagonal parity set in the second group;

reconstructing the diagonal parity strip in the first diagonal stripe reserved for parity of the corresponding diagonal parity sets of the first group by using the members of the corresponding diagonal parity set of the first group if the index of the failed disk is one less than the highest data disk index;

reconstructing the diagonal parity strip in the second diagonal stripe reserved for parity of the corresponding diagonal sets of the second group by using the members of the corresponding diagonal parity set of the second group if the index of the failed disk is one more than the lowest disk index;

reconstructing each of the horizontal parity strips of the failed horizontal parity disks by using the members of the corresponding horizontal parity sets;

reconstructing each of the diagonal parity strips of the failed first diagonal parity disk by using the members of the corresponding diagonal parity sets.

14. The method of claim 11, wherein reconstructing the lost data comprises, in the case of a failed data disk, a failed horizontal parity disk, and a failed second diagonal parity disk:

reconstructing each of the data strips of the failed data disk, starting with the strip on the lowest indexed stripe, by using the corresponding diagonal parity and the other members of the corresponding diagonal parity set in the first group;

reconstructing the diagonal parity strip in the first diagonal stripe reserved for parity of the corresponding diagonal sets of the first group by using the members of the corresponding diagonal parity set of the first group if the index of the failed disk is one less than the highest data disk index;

reconstructing the diagonal parity strip in the second diagonal stripe reserved for parity of the corresponding diagonal sets of the second group by using the members of the corresponding diagonal parity set of the second group if the index of the failed disk is one more than the lowest disk index;

reconstructing each of the horizontal parity strips of the failed horizontal parity disks by using the members of the corresponding horizontal parity sets;

reconstructing each of the diagonal parity strips of the failed second diagonal parity disk by using the members of the corresponding diagonal parity sets.

15. The method of claim 11, wherein reconstructing the lost data comprises, in the case of two failed data disks, one disk having a lower index, and the other disk having a higher index, and a failed second diagonal parity disk:

starting at the strip on the lowest indexed stripe of the lower indexed failed data disk and the strip on the lowest indexed stripe of the higher indexed failed data disk;

alternately reconstructing the data strip of the lower indexed failed data disk by using the corresponding diagonal parity and the other members of the corresponding diagonal parity set of the first group, then reconstructing the data strip of the higher indexed failed data disk by using the corresponding horizontal parity and the other members of the corresponding horizontal parity set, until each data strip in each of the failed disks is reconstructed;

reconstructing each of the diagonal parity strips of the failed data disks by using the members of the corresponding diagonal parity set; and reconstructing each of the diagonal parity strips of the failed second diagonal parity disk by using the members of the corresponding diagonal parity sets.

16. The method of claim 11, wherein reconstructing the lost data comprises, in the case of two failed data disk, one disk having a lower index, and the other disk having a higher index, and a failed first diagonal parity disk:

starting at the strip on the lowest indexed stripe of the lower indexed failed data disk and the strip on the lowest indexed stripe of the higher indexed failed data disk;

alternately reconstructing the data strip of the higher indexed failed data disk by using the corresponding diagonal parity and the other members of the corresponding diagonal parity set of the second group, then reconstructing the data strip of the lower indexed failed data disk by using the corresponding horizontal parity and the other members of the corresponding horizontal parity set, until each data strip each of the failed disks are reconstructed;

reconstructing each of the diagonal parity strips of the failed data disks by using the members of the corresponding diagonal parity set; and reconstructing each of the diagonal parity strips of the failed first diagonal parity disk by using the members of the corresponding diagonal parity sets.

17. The method of claim 11, wherein reconstructing the lost data comprises, in the case of two failed data disk, one disk having a lower index, and the other disk having a higher index, and a failed horizontal parity disk:

starting at the strip on the lowest indexed stripe of the lower indexed failed data disk and the strip on the lowest indexed stripe of the higher indexed failed data disk;

alternately reconstructing the data strip of the lower indexed failed data disk by using the corresponding diagonal parity and the other members of the corresponding diagonal parity set of the first group, then reconstructing the data strip of the higher indexed failed data disk by using the corresponding diagonal parity and the other members of the corresponding diagonal parity set of the second group, until each data strip each of the failed disks are reconstructed;

reconstructing each of the diagonal parity strips of the failed data disks by using the members of the corresponding diagonal parity set; and reconstructing each of the horizontal parity strips of the failed horizontal parity disk by using the members of the corresponding horizontal parity set.

18. The method of claim 11, wherein reconstructing the lost data comprises, in the case of three failed data disks, one disk having a lowest index, another disk having an intermediate index, and the other disk having a highest index:

starting at the strip on the lowest indexed stripe of the lowest indexed failed data disk, the strip on the lowest index stripe of the intermediate index failed data disk, and the strip on the lowest indexed stripe of the highest index failed data disk;

alternately reconstructing the data strip of the lowest indexed failed data disk by using the corresponding diagonal parity and the other members of the corresponding diagonal parity set of the first group, then reconstructing the data strip of the highest index failed data disk by using the corresponding diagonal parity and the other members of the corresponding diagonal parity set of the second group, and then reconstructing the data strip of the intermediate index failed data disk by using the corresponding horizontal parity and the other members of the corresponding horizontal parity set, until each data strip each of the failed disks are reconstructed; and reconstructing each of the diagonal parity strips of the failed disks data by using the members of the corresponding diagonal parity set.

19. The method of claim 1 further comprising:

reserving the horizontal parity disk to store horizontal parity;

reserving at least two diagonal parity disks to store diagonal parity;

reserving at least two diagonal parity stripes to store diagonal parity; and reserving the remaining unreserved strips in the remaining unreserved disks in the array for data.

20. The method of claim 17, wherein reserving at least two diagonal parity disks further comprises:

reserving a first diagonal parity disk to store diagonal parities calculated for the diagonal parity sets of the first group; and reserving a second diagonal parity disk to store diagonal parities calculated for the diagonal parity sets of the second group.

21. The method of claim 19, wherein reserving at least two diagonal parity stripes further comprises:

reserving a first diagonal parity stripe, across each of the disks in the array, to store diagonal parities calculated for the diagonal parity sets of the first group; and reserving a second diagonal parity stripe, across each of the disks in the array, to store diagonal parities calculated for diagonal parity sets of the second group.

22. The method of claim 1, wherein the step of calculating the diagonal parity further comprises calculating the diagonal parity of parity sets of data stored across each diagonal traversing stripes containing data in the array.

23. The method of claim 22, wherein calculating the diagonal parity, $d1P_i$, for each diagonal parity set of the first group traversing the stripes containing data using the exclusive-or sum of the information in each diagonal is performed according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-N+2,N-1} \oplus S_{i-N+3,N-2} \oplus \ldots S_{i,1}, \text{ for } N < i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

24. The method of claim 22, wherein calculating the diagonal parity, $d2P_i$, for each diagonal parity set of the second group traversing the stripes containing data using the exclusive-or sum of the information in each diagonal is performed according to the equations:

$$d2P_i = S_{1,N-i+1} S_{2,N-i+2} S_{3,N-i+3} \ldots S_{i,N}, \text{ for } i \leq N;$$

$$d2P_i = S_{i-N+1,1} S_{i-N+2,2} S_{i-N+3,3} \ldots S_{i,N}, \text{ for } N < i \leq M; \text{ and}$$

$$d2P_i = S_{i-N+1,1} S_{i-N+2,2} S_{i-N+3,3} \ldots S_{M,M+N-i}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

25. The method of claim 1, wherein storing the diagonal parities further comprises:

storing at least some of the calculated diagonal parities of each diagonal parity set in the first group in a respective one of a plurality of strips of a first diagonal parity disk; and storing a remainder of the calculated diagonal parities of each diagonal parity set in the first group in a respective one of a plurality of strips in a first diagonal parity stripe so that no members of a contributing diagonal parity set have the same disk index as the disk index of the respective one of a plurality of strips of the diagonal parity stripe.

26. The method of claim 25, wherein storing the remainder of the calculated diagonal parities further comprises storing the remainder in a diagonal parity stripe so that each respective diagonal parity is stored in a strip of the diagonal parity stripe having a smaller disk index than all contributing disk indexes of each data strip of the corresponding diagonal parity set.

27. The method of claim 1, wherein storing the diagonal parities further comprises:
   storing at least some of the calculated diagonal parities of each diagonal parity set in the second group in a respective one of a plurality of strips of a second diagonal parity disk; and
   storing a remainder of the calculated diagonal parities of each diagonal parity set in the second group in a respective one of a plurality of strips in a second diagonal parity stripe so that the no members of a contributing diagonal parity set have the same disk index as the disk index of the respective one of a plurality of strips of the diagonal parity stripe.

28. The method of claim 27, wherein storing the remainder of the calculated diagonal parities further comprises storing the remainder in a diagonal parity stripe so that each respective diagonal parity is stored in a strip of the diagonal parity stripe having a larger disk index than all contributing disk indexes of each data strip of the corresponding diagonal parity set.

29. The method of claim 1, wherein the step of calculating the horizontal parity further comprises calculating the horizontal parity of parity sets of data stored across each stripe containing data in the array.

30. The method of claim 29, wherein calculating the horizontal parity, $hP_i$, for each stripe containing data using the XOR of the information in each data strip is performed according to the equation:

$$hP_i = S_{i,1} \oplus S_{i,2} \oplus S_{i,3} \ldots \oplus S_{i,N}$$

where i is an index counter for the number of stripes in the array containing data, $S_{i,j}$ is the information stored in strip i of disk j, and N is the number of disks containing data.

31. The method of claim 1, wherein calculating the horizontal and diagonal parities for each parity set comprises computing the exclusive-or (XOR) of the information in each data strip of each parity set.

32. The method of claim 1, wherein the step of storing the calculated horizontal parity for each horizontal parity set further comprises storing the calculated horizontal parity in a strip of the horizontal parity disk in the same stripe from which the associated horizontal parity set was assembled.

33. The method of claim 1, wherein the step of storing the calculated diagonal parity for each diagonal parity set further comprises:
   sequentially storing, for the diagonal parity sets of the first group, beginning with the strip on the lowest indexed stripe, the calculated diagonal parity, beginning with the first diagonal parity set in the first group, in a strip of the first diagonal parity disk until the diagonal parity strip on the stripe having an index two less than the highest indexed stripe is filled; and
   sequentially storing, beginning with the strip on the lowest indexed disk, the calculated diagonal parity for the remaining diagonal parity sets of the first group in the first diagonal parity stripe until the calculated diagonal parities for each of the diagonal parity sets in the first group have been stored.

34. The method of claim 1, wherein the step of storing the calculated diagonal parity for each diagonal parity set further comprises:
   sequentially storing, for diagonal parity sets of the second group, beginning with the strip on the lowest indexed stripe, the calculated diagonal parity, beginning with the first diagonal parity set for the second group, in a strip of the second diagonal parity disk until the diagonal parity strip on the stripe having an index two less than the highest indexed stripe is filled; and
   sequentially storing, beginning with the strip on the highest indexed disk containing data, the calculated diagonal parity for the remaining diagonal parity sets of the second group in the second diagonal parity stripe until the calculated diagonal parities for each of the diagonal parity sets in the second group have been stored.

35. A system for providing disk fault tolerance in an array of independent disks, comprising:
   an array of disks consecutively indexed and organized into a plurality of indexed stripes, each stripe further comprising a plurality of strips indexed by both disk and stripe; and
   an array controller coupled to the disk array and configured to:
   a. arrange the strips containing data into horizontal and diagonal parity sets each having at least one data strip as a member;
   b. group the diagonal parity sets into a first group of diagonal parity sets and a second group of diagonal parity sets so that each data strip is a member of a diagonal parity set in the first group and a diagonal parity set in the second group;
   c. calculate the corresponding horizontal and diagonal parities for each of the parity sets; and
   d. store each of the calculated parities in a corresponding strip.

36. The system of claim 35, wherein the array controller is further configured to assemble horizontal parity sets across each stripe of the array containing data strips and assemble diagonal parity sets across diagonals traversing the stripes in the array containing data.

37. The system of claim 36, wherein the array controller is further configured to establish a first diagonal parity set for the first group as a data strip having the lowest disk and lowest stripe index, to establish consecutive diagonal parity sets by diagonally assembling the data strips adjacent to the previously established diagonal parity set until each data strip has been assembled into a diagonal parity set, and to group the established diagonal parity sets into the first group (of diagonal parity sets).

38. The system of claim 36, wherein the array controller is further configured to establish a first diagonal parity set for the second group as a data strip having the highest disk and lowest stripe index, to establish consecutive diagonal parity sets by diagonally assembling the data strips adjacent to the previously established diagonal parity set until each data strip has been assembled into a diagonal parity set, and to group the established diagonal parity sets into the second group of diagonal parity sets.

39. The system of claim 35, wherein the array controller is further configured to calculate a horizontal parity for each horizontal parity set, wherein a disk contributes at most one data strip to the calculation of a specific horizontal parity.

40. The system of claim 35, wherein the array controller is further configured to store the calculated horizontal parity of each horizontal parity set in a strip of a horizontal parity disk.

41. The system of claim 35, wherein the array controller is further configured to calculate a diagonal parity for each diagonal parity set, wherein a disk contributes at most one data strip to the calculation of a specific diagonal parity.

42. The system of claim 35, wherein the array controller is further configured to store the calculated diagonal parity of each diagonal parity set in the first group in a strip of a diagonal parity disk or a strip of a first diagonal parity stripe so that the diagonal parity is stored in a strip of the first diagonal parity stripe having a smaller disk index than all contributing disk indexes of each data strip of the corresponding diagonal parity set.

43. The system of claim 35, wherein the array controller is further configured to store the calculated diagonal parity of each diagonal parity set in the second group in a strip of a diagonal parity disk or a strip of a second diagonal parity stripe so that the diagonal parity is stored in a strip of the second diagonal parity stripe having a greater disk index than all contributing disk indexes of each data strip of the corresponding diagonal parity set.

44. The system of claim 35, wherein the array controller is further configured to calculate the horizontal and diagonal parities for each parity set by computing the exclusive-or (XOR) of the information in each data strip of each parity set.

45. The system of claim 35 wherein the array controller is further configured to reserve the horizontal parity disk to store horizontal parity; to reserve at least two diagonal parity disks to store diagonal parity; to reserve at least two diagonal parity stripes, across each of the disks in the array, to store diagonal parity; and to reserve the remaining unreserved strips in the remaining unreserved disks in the array for data.

46. The system of claim 35, wherein the array controller is further configured to calculate horizontal parity of parity sets of data stored across each stripe containing data in the array.

47. The system of claim 35, wherein the array controller is further configured to store the calculated horizontal parity in a strip of the horizontal parity disk corresponding to the stripe comprising the associated horizontal parity set.

48. The system of claim 35, wherein the array controller is further configured to calculate the diagonal parity of parity sets of data stored across each diagonal traversing stripes containing data in the array.

49. The system of claim 35, wherein the array controller is further configured to reconstitute lost data on three simultaneously failed disks in the array by using the corresponding stored parity information and the data stored on the remaining functional disks.

* * * * *